United States Patent

[11] 3,536,212

[72] Inventor Per Iversen
  Drobak, Norway
[21] Appl. No. 739,489
[22] Filed June 24, 1968
[45] Patented Oct. 27, 1970
[73] Assignee Aktiebolaget Nordstroms Linbanor
  Stockholm, Sweden
  a corporation of Sweden
[32] Priority July 26, 1967
[33] Sweden
[31] 10,878/67

[54] CONVEYING MEANS INCLUDING AN INTERMITTENTLY CONVEYING GOODS CARRIER
  9 Claims, 5 Drawing Figs.
[52] U.S. Cl. ................................................. 214/38,
  214/15, 214/16, 238/10

[51] Int. Cl. ................................................. B65g 67/02,
  B65g 69/26
[50] Field of Search ........................................ 214/38.46,
  16(B), 15, 16.4, 16.42

[56] References Cited
UNITED STATES PATENTS

| 3,182,823 | 5/1965 | Chasar | 214/38X |
| 3,421,641 | 1/1969 | Frey | 214/38 |
| 3,447,701 | 6/1969 | Sause | 214/38 |

Primary Examiner—Robert G. Sheridan
Attorney—Harry Cohen

ABSTRACT: A goods-conveyor system is provided wherein the carrier for the goods as well as the goods-loading and goods-unloading stations are adapted to be positioned along a track whereby said stations may be variably positioned in relation to the track without blocking cross traffic.

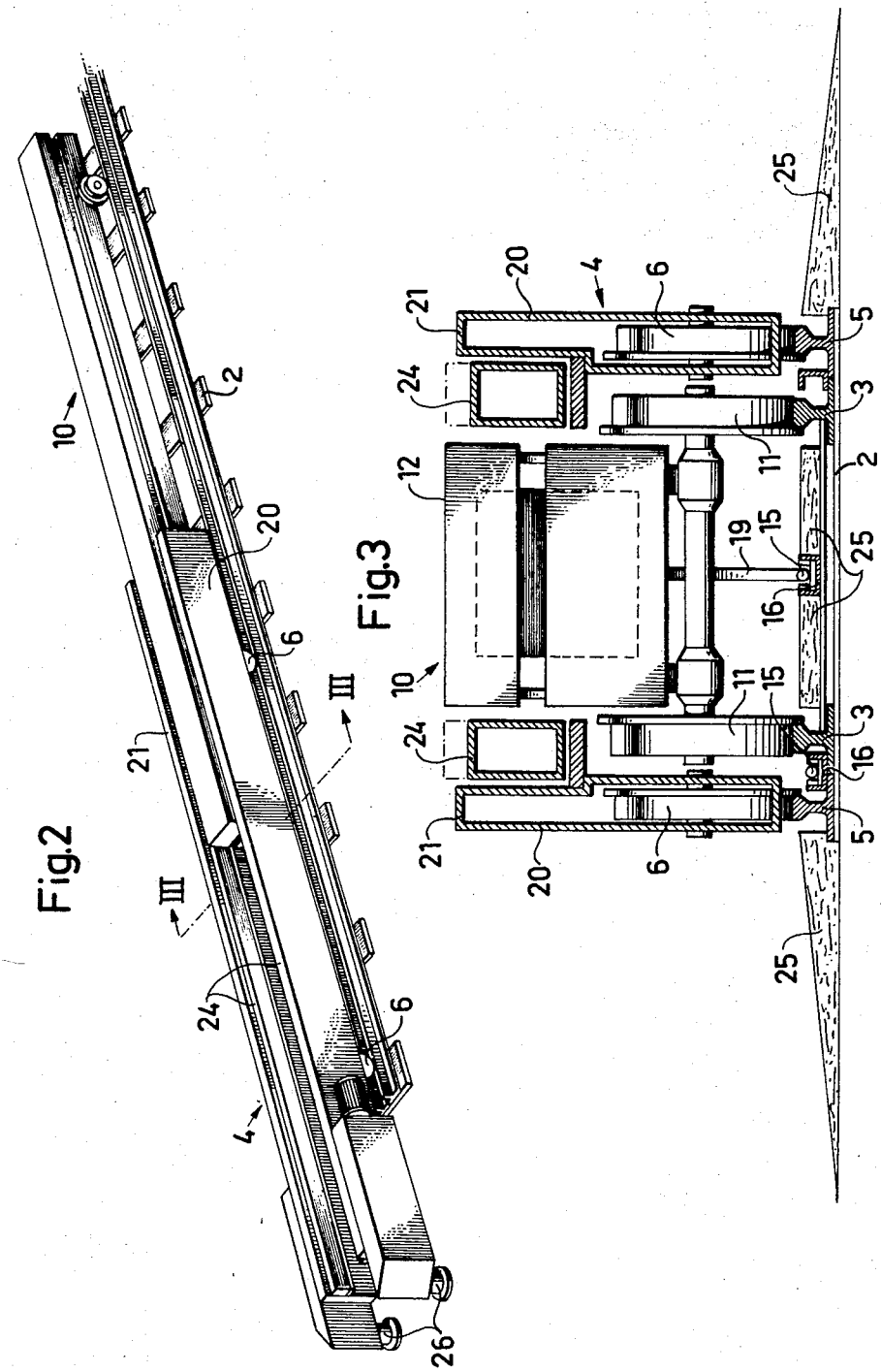

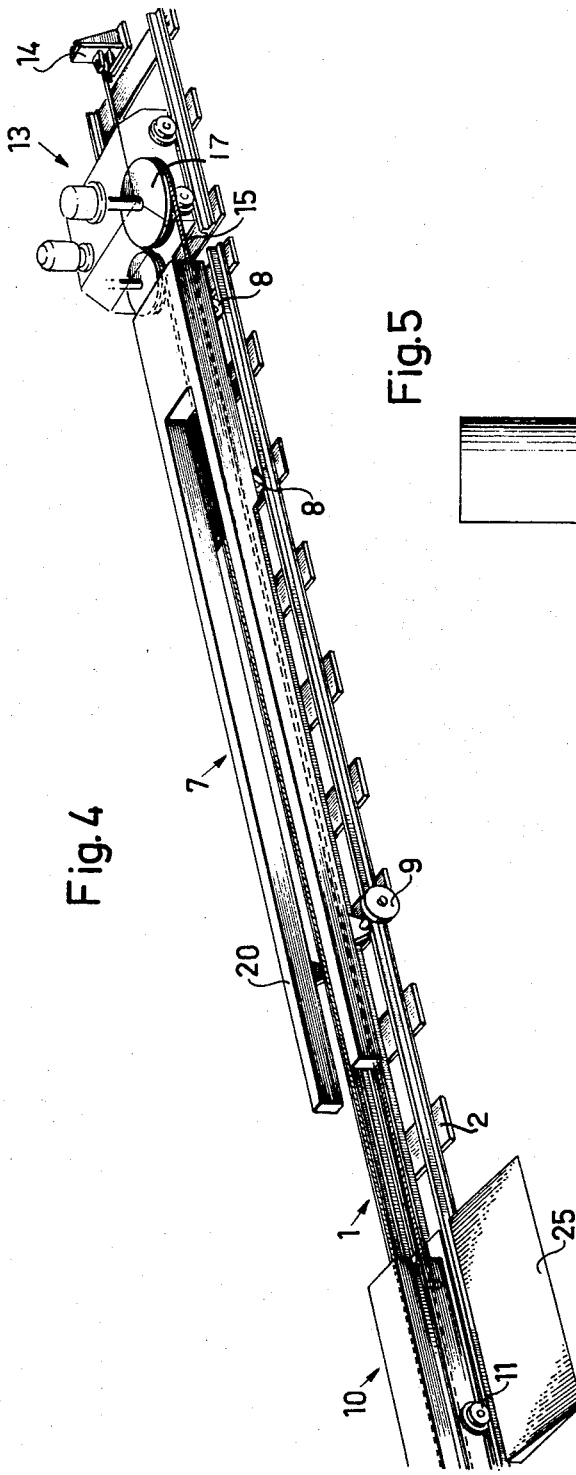
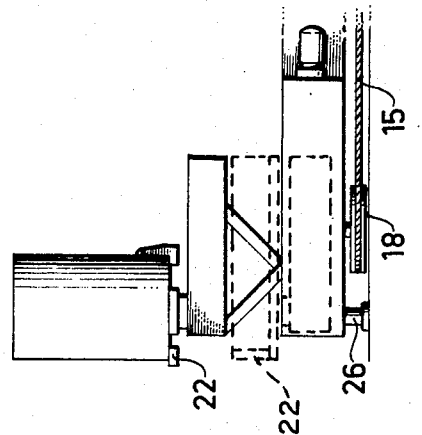

CONVEYING MEANS INCLUDING AN INTERMITTENTLY CONVEYING GOODS CARRIER

The present invention is concerned with a conveyor system for loading and unloading preferably bulk goods at docks, in warehouses, storage buildings or similar storage and loading sites, having a substantially flat foundation for the conveying system which includes two stations, one station for receiving the goods and the second for discharging the same.

Conveying means intended for use when transporting bulk goods from, for instance, a ship at the quayside to a warehouse include movable conveyor belts, walking conveyors etc., which when placed in position create an obstruction to crossing traffic. Temporary interruptions to allow such traffic to pass is laborious and disturbs the loading or unloading sequence. The method of using trucks or wagons in an attempt to provide free passage for crossing traffic requires more labor, and results in discontinuity of the loading and unloading sequences. If the wagons run on rails the possibilities of freely selecting the unloading or loading site are also restricted.

The object of the present invention is to provide a conveying means which retains the advantages of a conveyor belt or a walking conveyor without blocking the passage of crossing traffic. The system according to the invention satisfies the very high requirements placed on flexibility with regard to free selection of the site where a conveyor path can be placed between any selected end positions of a substantially horizontal foundation. This object is achieved by the system according to the invention which includes two stations, the one station for receiving goods and the other station for discharging goods, and is mainly characterized in that the two stations and a goods a carrier or supporter running between said stations are each movably adapted to run on at least one pair of wheels along a track and arranged to move goods within the conveying arrangement from the one station to the other.

An embodiment of the arrangement will now be described with reference to the accompanying drawings.

FIG. 2 shows a goods receiving station corresponding to the station shown in FIG. 1, although with the goods receiving means shown in more detail in FIG. 5 removed, and with the goods carrier partly inserted in the station.

FIG. 3 shows the same station and the goods carrier seen in a vertical section through III–III in FIG. 2.

FIG. 4 shows the goods carrier and the station to which it delivers its goods, and also shows the goods carrier drive unit arranged on a carriage.

FIG. 5 shows a side view of the goods receiving arrangement at the station, according to FIG. 1.

Figure 1:
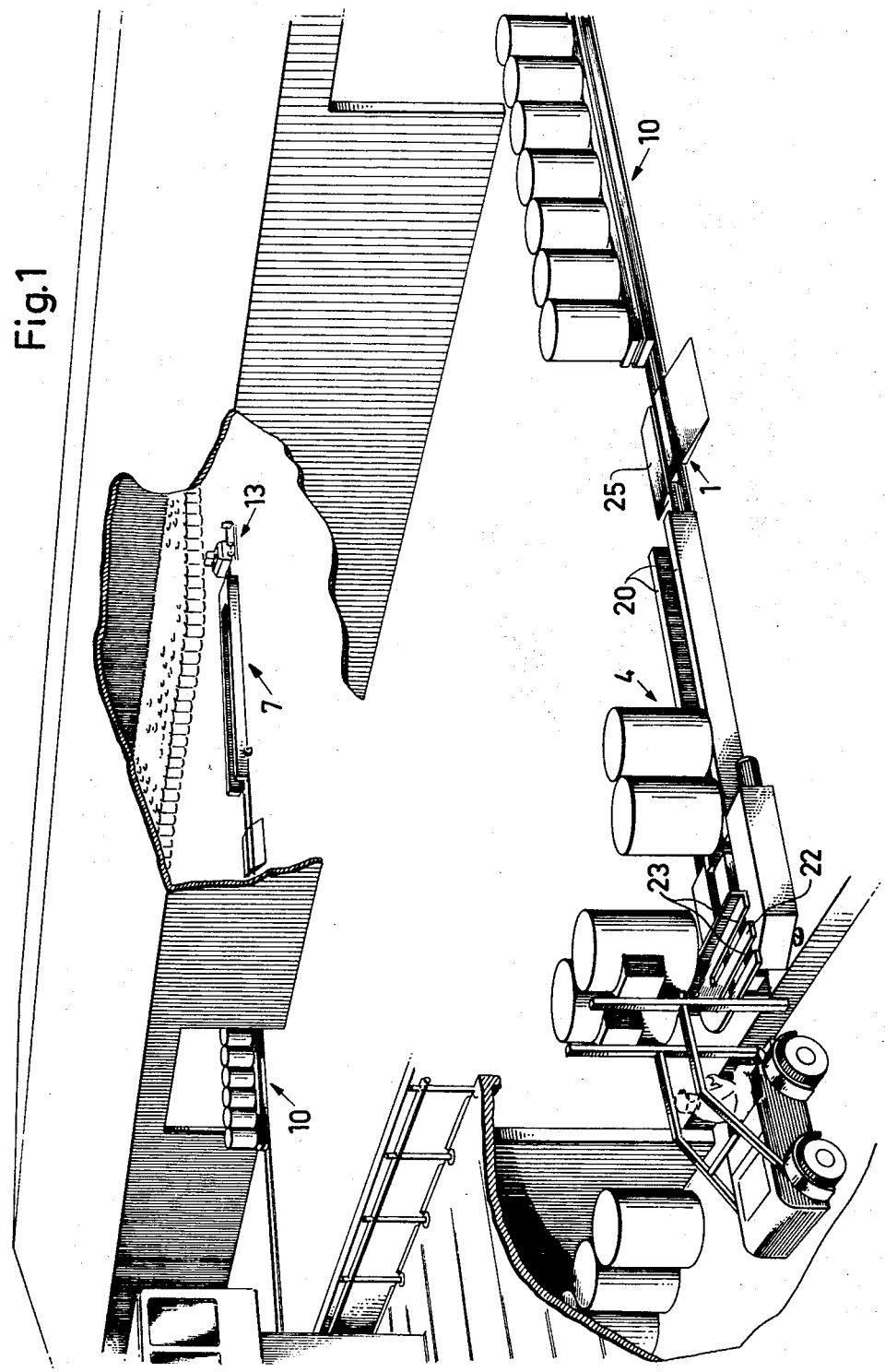
FIG. 1 shows in the foreground the goods receiving station of the conveying arrangement during the unloading of reels of paper from a ship, and the goods carrier is adapted to move between the two stations of the arrangement. Shown in the background is a further goods carrier operating in a warehouse, and its corresponding discharge station for the goods.

In order to permit optional positioning of the conveying system which runs on a track 1, the said track is composed of building elements including rails 3 joined laterally by cross beams 2 (FIG. 3). The track length for each building element has been selected so that each element may easily be moved by means of a forklift truck for instance. The major portion of the combined track length includes only one single track. A further track of greater width is arranged, however, on the quayside adjacent the ship for the goods receiving station 4, and arranged with its center line coincident with the track 1. This extra track comprises two rails 5 which are joined to the remaining portions of the building element of this track section. To enable traffic in the form of trucks or similar vehicles to pass over the single track or double track, ramp elements 25 can be placed at suitable crossing locations along the track.

The goods receiving station 4 is supported by wheels 6 on the track presenting the greater track width, i.e., on the rails 5. A second station 7 is supported by four wheels, which partially support the stations and which run on the track 1, i.e., on the rails 3. This station is provided with a further two wheels 9 which run outside the track, on both sides thereof, in direct contact with the flat foundation on which the tracks are placed, i.e., on the floor of the quay or warehouse.

Passing between the aforementioned two stations on the track 1 is a goods carrier 10. The goods carrier 10 comprises a carriage supported by wheels 11 and presents a raisable and lowerable supporting surface 12.

A drive unit is placed on a carriage 13 beyond the station 7, for the purpose of advancing the goods carrier 10. The carriage is placed on the track 1 and secured by a stationary anchoring means 14. The drive force is imparted to the goods carrier by means of an endless chain, rope or the like 15, which moves in grooves 16 arranged for this purpose in the elemental building sections of the track, between a driving support wheel 17 on the carriage 13 and a deflector wheel 18, arranged beneath the goods receiving station 4. The goods carrier is connected with this line by means of a coupling element 19. The drive unit is suitably electrohydraulic and provided with automatic line tensioning means.

The goods carrier 10 is intended to be advanced alternately between the two stations 4 and 7, of which the unloading station 7 is intended to be placed and anchored at a location along the track which is well suited with respect to the unloading of the goods from this station and for their being stored in position at the storage site in the warehouse, for instance by means of a truck. Movement of the station to another site along the track is also suitably effected by means of trucks, used as pushing means.

The two stations are provided with two fork-shaped ramps 20 projecting in the direction of the track and between which the goods carrier 10 enters when it is in either of its end positions. The levels to which the supporting surface 12 can be raised and lowered are so adjusted in relation to supports surfaces 21 arranged on the ramps so that the goods can be picked up off the ramps by the goods carrier 10, by raising the supporting surface, and conversely placed on the ramps by lowering said surface.

Thus the goods carrier 10, inserted in the station 4, can pick up all the goods positioned across its ramps by raising the carrying surface 12. Subsequent to being moved to the station 7 on the same track the goods can be unloaded, to rest across the ramps at this station, by lowering the supporting surface.

The station 4 receiving goods from the ship is provided with a goods positioning device, for facilitating the positioning of the goods on the conveyor system. To enable the goods to be deposited, for instance by means of a truck, at one and the same place during the whole unloading procedure the station 4, at its end adjacent the ship is provided with a goods receiving platform 22, which is capable of being raised and lowered and, furthermore, can be turned around a verticle shaft. In this way the level of the platform in relation to the unloading plane can be made independent of the height of the unloading plane over the quay; which height, for instance, may be subjected to changes owing to the tide, and furthermore, the longitudinal axis of the platform can be positioned parallel with the side of the ship during removal of the goods therefrom, which considerably facilitates that portion of the unloading operation which is manually controlled. As shown in FIG. 1 two reels of paper can be simultaneously placed on the platform by means of a truck. The platform is located at a height and arranged in a position of rotation appropriate for this working operation, and after receiving the goods is lowered to a predetermined lower level, whereupon the platform is then rotated so that slots 23 arranged in the platform are correctly positioned in to permit a walking conveyor provided with two shuttles 24, to move the goods out onto the ramps 20.

The two shuttles 24 of the walking conveyor are arranged one in each of the two ramps 20 of the station 4, and advance the goods by effecting a reciprocating movement, wherewith the supporting surfaces of said shuttles are located during the forward feeding movement towards the end of the ramps remote from the ship above the support surfaces 21 of the ramps, but during the return movement the shuttles are lowered so that their supporting surfaces come below the support surface of the ramps. When the space above the ramps has been filled with goods, the goods are lifted and carried away by the goods carrier 10 in the aforedescribed manner.

The goods receiving station is provided with two, suitably hydraulically operated support feet 26, which take up a portion of the load of the goods and of the weight of the station, and which, at the same time, fix the station in the desired position. Thus, the goods receiving station can be easily and rapidly freed and moved along the double track, to provide a temporary passage way along the edge of the quay.

The platform of the goods receiving station is suitably controlled automatically in a predetermined cycle, adjusted according to the capacity of the system in general. Selective starts subsequent to interruptions in the working rhythm can be carried out, however, by truck drivers on board ship, by means of press-button operated ultrasound equipment. Impulse means along the conveyor path sense when the goods receiving station 4 is filled, when the goods carrier 10 arrives at the unloading station 7 and shall be braked, and when it has reached the inner position in this station. These impulses control the lifting of the goods from the goods carrier, its acceleration, retardation and goods positioning and return to the receiving station. Corresponding means on the goods receiving station also ensure that it is inserted in the correct loading position.

The transport means may also be adapted to convey goods in the opposite direction to that described. It may be made reversible or adapted to convey in one direction only, and the invention is not restricted to the described embodiment, but can be varied within the scope of the following claims.

I claim:

1. A goods-conveyor system operable on a track, comprising a plurality of goods-support means movable on said track longitudinally thereof to selected stations spaced from each other longitudinally of the track, goods-carrier means movable on said track to and from said stations, means for moving said goods-carrier means in relation to said goods-support means to transfer goods from said goods-support means to said goods-carrier means, and means coupled to said goods-carrier means for moving the latter to and from each of said stations.

2. A goods-conveyor system according to claim 1, further characterized in that said track comprises a section, bodily movable to a selectable position and comprising, in unitary relation, a plurality of laterally spaced longitudinally extending rails and a plurality of laterally spaced cross beams on which said rails are mounted.

3. A goods-conveyor system according to claim 2, further characterized in that the means for moving said goods-carrier comprises an endless line coupled to said goods-carrier drive means and line-reflexing means coupled to said line for actuating said line.

4. A goods-conveyor system according to claim 3, further characterized in that said drive means is located adjacent one of said stations and the line-reflexing means is located at another of said stations.

5. A goods-conveyor system according to claim 1, characterized in that the goods-carrier means comprises a carriage which is adapted to be advanced on the track alternately to said each of said support means and said support means comprising a fork-shaped ramp having laterally spaced sides, said goods-carrier means being movable into positions between said ramp sides, said goods-carrier means being provided with a raisable and lowerable upper support surface which is adapted when being raised at respective end positions to pick up goods from one of said storage ramps of one station and to deposit goods supported on another of said ramps.

6. A goods-conveyor system according to claim 5, further characterized in that the system comprises rotatably and vertically movable means for depositing goods on said ramps for movement by said last mentioned conveyor means to said selected positions on said ramps.

7. A goods-conveyor system according to claim 5, characterized in that the track comprises a first pair of laterally spaced rails on which said goods-carrier is mounted and a second pair of laterally spaced rails disposed laterally outwardly of the rails of said first pair, and means for supporting one of said ramps for movement on said second pair of rails.

8. A goods-conveyor system according to claim 7, characterized in that said second pair of rails extends from a first one of the stations toward a second one of said stations, and means carried by the ramp at said second one of the stations for supporting said last mentioned ramp for movement longitudinally of said first pair of rails.

9. A goods-conveyor system according to claim 1, further characterized in that the system comprises conveyor means for placing the goods in selected positions on said ramps longitudinally thereof.